United States Patent [19]

Broussard et al.

[11] Patent Number: 4,668,725

[45] Date of Patent: May 26, 1987

[54] STABILIZING COMPOUNDS FOR ORGANIC POLYMERS, AND STABILIZED POLYMER COMPOUNDS WHICH CONTAIN THEM

[75] Inventors: Fabio Broussard, Brusaporto; Carlo Busetto, S. Donato Milanese, both of Italy

[73] Assignees: Enichem Sintesi S.p.A.; Bozzetto Industrie Chimiche S.p.A., both of Palermo, Italy

[21] Appl. No.: 787,656

[22] Filed: Oct. 16, 1985

[30] Foreign Application Priority Data

Oct. 24, 1984 [IT] Italy ................................ 23288 A/84

[51] Int. Cl.$^4$ .................. C07C 103/78; C07C 69/675; C08K 5/20; C08K 5/13
[52] U.S. Cl. .................... 524/219; 524/291; 560/61; 560/70; 560/75
[58] Field of Search ....................... 524/219, 222, 291; 560/61, 67, 70, 73, 75, 74

[56] References Cited

U.S. PATENT DOCUMENTS

| | | | |
|---|---|---|---|
| 3,112,338 | 11/1963 | Smutney | 524/291 |
| 3,285,855 | 11/1966 | Dexter et al. | 524/291 |
| 3,649,667 | 3/1972 | Song et al. | 560/75 |
| 3,917,672 | 11/1975 | Schmidt | 524/291 |
| 4,305,868 | 12/1981 | Wheeler et al. | 524/219 |
| 4,598,113 | 7/1986 | Stephen et al. | 524/291 |

FOREIGN PATENT DOCUMENTS 1290848 9/1972 United Kingdom .
1396875 6/1975 United Kingdom .

Primary Examiner—Veronica P. Hoke
Attorney, Agent, or Firm—Hedman, Gibson, Costigan & Hoare

[57] ABSTRACT

Organic compounds of phenolic nature for stabilizing organic polymers are described together with the process for preparing said stabilizing compounds. Stabilized polymer compositions incorporating said stabilizing compounds are also described.

2 Claims, No Drawings

STABILIZING COMPOUNDS FOR ORGANIC POLYMERS, AND STABILIZED POLYMER COMPOUNDS WHICH CONTAIN THEM

This invention relates to organic compounds of phenolic nature for stabilising organic polymers, the polymer compositions stabilised by said stabilising compounds, and the process for preparing the stabilising compounds.

Organic polymers are known to suffer degradation with the passage of time due to exposure to environmental conditions, and this degradation manifests itself as a worsening of the polymer physical characteristics, such as a reduction in the ultimate tensile stress and flexibility, these being accompanied by a change in the viscosity index.

In order to oppose this degradation, it is usual in industry to introduce into the polymers small quantities of antioxidant compounds, generally in the form of sterically hindered phenols, such as those described in "Die Stabilisierung der Kunststoffe gegen Licht und Warme", by J. Voigt, Springer Verlag, Berlin (1066) pages 208–230.

The problems encountered in the stabilisation of organic polymers derive essentially from incompatibility between the stabilising compound and the polymer, from the difficulties in implementing effective stabilisation under the hot polymer working conditions, and from the difficulty of obtaining a sufficiently durable polymer stabilisation. In stabilisation by means of known stabilising compounds, these problems are always manifested, whether to a greater or lesser degree, and there is therefore a need for stabilising compounds which have greater compatibility with the organic polymers, are capable of effectively stabilising the polymers during hot working, and are able to maintain said stability for long periods of time.

It has now been found that these requirements can be satisfied by the phenolic stabilising compounds of the present invention, which can be defined by the general formula:

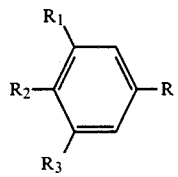

where R is chosen from hydrogen and the following radicals;
carboxyl;

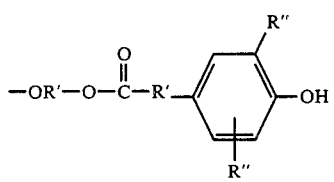

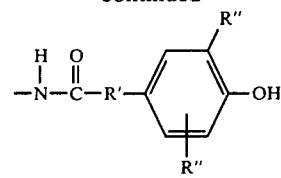

and $R_1$, $R_2$ and $R_3$ are chosen from hydrogen and the radical:

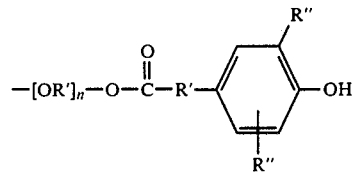

(where n is zero or 1, R' is a linear or branched alkylidene radical containing from 1 to 5 carbon atoms, and R", which can both be equal or different, are linear or branched alkyl radicals containing from 1 to 6 carbon atoms);

on condition that when R is hydrogen or carboxyl, $R_1$, $R_2$ and $R_3$ are other than hydrogen, and when R is other than hydrogen and carboxyl, at least one of $R_1$, $R_2$ and $R_3$ is other than hydrogen.

In the preferred embodiment:
when R is hydrogen or carboxyl, $R_1$, $R_2$ and $R_3$ are other than hydrogen and n=0;
when R is

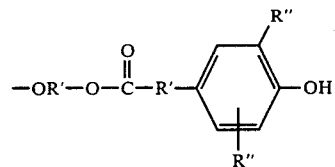

one of $R_1$, $R_2$ and $R_3$ is other than hydrogen and n=1;
when R is

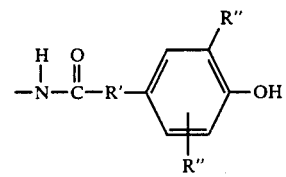

one of $R_1$, $R_2$ and $R_3$ is other than hydrogen and n=0.

Again in the preferred embodiment, R' is the ethylidene group and R" are tertiary butyl groups both disposed in the ortho position with respect to the phenolic hydroxyl.

Examples of phenolic stabilising compounds covered by the preceding general formula are:

(1) benzene-1,2,3-tri[3-(4'-hydroxy-3',5'-di-tert-butylphenyl)propionate];

(2) benzene-3,4,5-tri[3-(4'-hydroxy-3',5'-di-tert-butylphenyl)propionate]-1-carboxylic acid;

(3) phenylene-1,4-bis(oxyethylidene)-bis[3-(4'-hydroxy-3',5'-di-tert-butylphenyl)propionate];

(4) phenylene-1-[3-(4'-hydroxy-3',5'-di-tert-butyl-phenyl)propionate]-4-[3-(4'-hydroxy-3',5'-di-tert-butyl-phenyl)propionamide].

The phenolic stabilising compounds according to the present invention can be prepared from phenolic or alcoholic polyhydroxyl compounds, or from aromatic aminophenolic compounds and the appropriate acid halide. Examples of these compounds are pyrogallol, gallic acid, phenylene-1,4-cis(β-hydroxyethylideneoxy), para-aminophenol and 4-hydroxy-3,5-di-tert-butyldihydrocinnamoyl chloride.

Conveniently, the reaction is conducted with stoichiometric or approximately stoichiometric quantities of the reagents, in the presence of a diluent preferably consisting of an aromatic hydrocarbon such as toluene or xylene.

The reaction temperature can vary within a range of between about 80° and about 130° C., preferably operating at the reflux temperature at atmospheric pressure of the aromatic hydrocarbon used as the diluent.

In the preferred embodiment, the hydrogen halide acid which evolves as the reaction by-product is continuously removed from the reaction medium by a stream of inert gas such as nitrogen.

When operating under the aforesaid conditions, the reaction time generally varies from about 2 to about 10 hours.

The stabilising compound thus formed is separated from the reaction mixture by the normal methods. For example, it is precipitated by cooling the reaction mixture to ambient temperature or to less than ambient temperature. Alternatively, the diluent is removed from the reaction mixture by distillation, and the distillation residue thus obtained can be crystallised, if necessary, for example by contact with an organic solvent which facilitates crystallisation, such as petroleum ether.

The crude solid products thus obtained can be purified by recrystallisation from suitable organic solvents such as toluene or ethyl acetate.

The organic polymers which are stabilised by the stabilising compounds of the present invention are olefinic polymers in general, in particular polypropylene and polyethylene of low and high density. Other polymers which can be stabilized are polystyrene, polyvinylchloride and elastomeric polymers in general.

The compositions of the present invention contain the organic polymer together with a stabilising compound or mixture of stabilising compounds according to the present invention in a quantity of between 0.1% and 5% by weight, the preferred quantity being of the order of 0.1–0.5% by weight.

The stabilising compounds of the present invention can be introduced into the organic polymer to be stabilised by any known method which allows uniform distribution of the stabilising compound within the polymer.

The experimental examples described hereinafter illustrate but do not limit the scope of the invention.

EXAMPLE 1

Preparation of benzene-1,2,3-tri[3-(4'-hydroxy-3',5'-di-tert-butyl-phenyl)propionate]

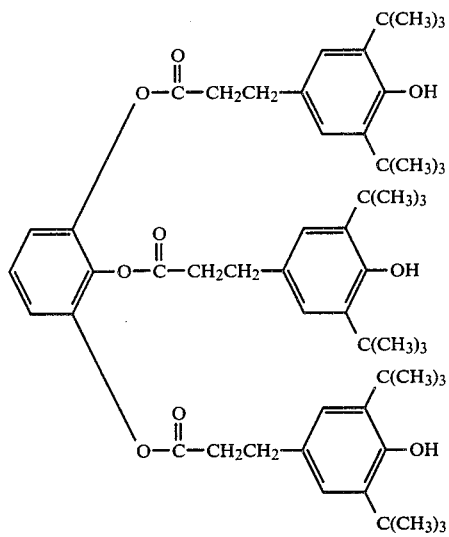

Pyrogallol (7.08 g; 0.056 moles), 4-hydroxy-3,5-di-tert-butyldihydrocinnamoyl chloride (50 g; 0.169 moles) and 180 ml of toluene are fed into a four-neck glass flask fitted with an agitator, thermometer, bulb condenser and nitrogen introduction system.

While passing nitrogen through the mixture, it is heated to toluene reflux temperature (105°–110° C.). An emission of acid fumes (HCl) from the condenser is noticed, this lasting about 4 hours.

On termination of the reaction, the toluene is distilled off at 20–30 mmHg pressure, to obtain a product in the form of an oily residue which crystallises on adding n-hexane. 24.4 g of the stated product are recovered (yield 48.1%) having a melting point of 138°–140° C.

EXAMPLE 2

Preparation of benzene-3,4,5-tri[3-(4'-hydroxy-3',5'-di-tert-butyl-phenyl)propionate]-1-carboxylic acid

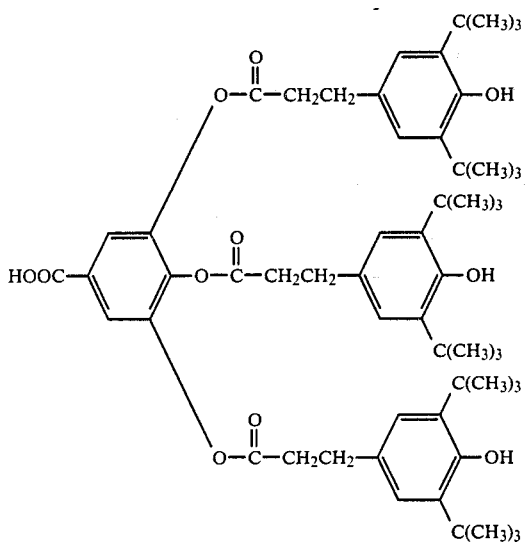

The procedure of Example 1 is followed, feeding gallic acid (21 g; 0.123 moles), 4-hydroxy-3,5-di-tert-butyldihydrocinnamoyl chloride (110 g; 0.371 moles) and 270 ml of xylene into the flask. The mixture is heated to 125°–130° C., and after 3 hours the gallic acid has completely dissolved in the liquid reaction mixture. The reaction is continued for a further 4 hours at the stated temperature.

At the end of this time, the xylene is distilled off at a pressure of 20 mmHg, to obtain a product in the form of an oily residue which is treated with petroleum ether, resulting in slow solidification of the oil. The solid thus obtained is crystallised from ligroin to obtain 95 g (yield 81.3%) of the stated compound with a melting point of 185°–186° C.

EXAMPLE 3

Preparation of 1,4-phenylene-bis-(oxyethylidene)-bis-[3-(4'-hydroxy-3',5'-di-tert-butylphenyl)propionate]

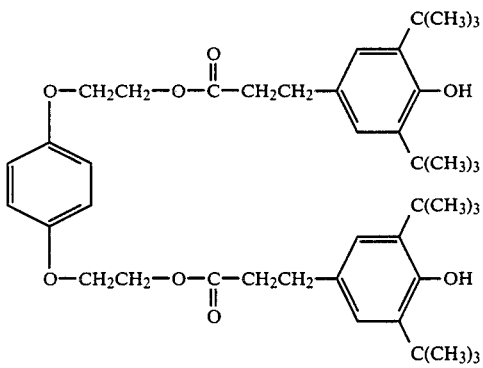

35 g (0.118 moles) of 4-hydroxy-3,5-di-tert-butyldihydrocinnamoyl chloride and 80 ml of toluene are fed into a four-neck flask fitted with an agitator, thermometer, bulk condenser and nitrogen introduction tube. The mixture is kept under agitation at ambient temperature until a clear solution is obtained, to which 11.6 g (0.059 moles) of phenylene-1,4-bis($\beta$-hydroxyethylideneoxy) are added, and remain suspended in the liquid reaction mixture. The reaction mixture is heated gradually to 90° C. while passing a nitrogen stream through the mass.

Acid fumes (HCl) are seen to emerge from the condenser, and after one hour the suspended solid has completely dissolved with the formation of an amber-coloured clear solution. The reaction is maintained for a further 4 hours at 90° C. under a nitrogen stream until no further acid fumes are noticed.

The reaction mixture is cooled to ambient temperature to form a solid white precipitate which is filtered off, washed with toluene and dried. In this manner 26 g of the stated compound are obtained (yield 61.4%) with a melting point of 134°–135° C.

After crystallisation from toluene, the melting point rises to 136°–137° C.

EXAMPLE 4

Preparation of phenylene-1-[3-(4'-hydroxy-3',5'-di-tert-butylphenyl)-propionate]-4-[3-(4'-hydroxy-3',5'-di-tert-butylphenyl)-propionamide]

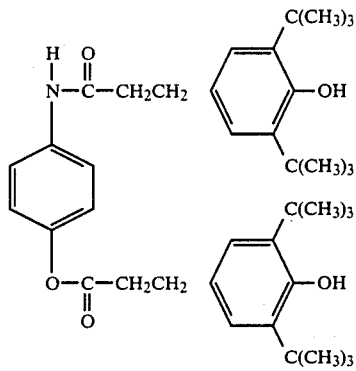

63 g (0.212 moles) of 4-hydroxy-3,5-di-tert-butyldihydrocinnamoyl chloride and 170 ml of xylene are fed into a four-neck flask fitted with an agitator, thermometer, bulb condenser and nitrogen introduction tube. A solution is obtained to which 11.5 g (0.105 moles) of paraaminophenol are added, and remain suspended in the liquid reaction mixture. The mixture is heated gradually under agitation while passing a nitrogen stream to 118° C., and this temperature is maintained for two hours during which acid fumes (HCl) are seen to emerge from the condenser. The reaction mixture is then heated to 125° C. to completely dissolve the paraaminophenol. The mixture is maintained at 125°–128° C. for the next two hours, and is then cooled to ambient temperature with the consequent formation of a white precipitate which is filtered off, washed with xylene and dried.

60 g (yield 90.7%) of the stated compound are obtained, and after crystallisation from ethyl acetate melts at 177°–179° C.

The stabilising action of the stabilising compounds of the present invention is evaluated by carrying out tests on model systems arranged to simulate the interaction mechanism between the stabilising compound and the polymer during degradation, and in addition accelerated thermal ageing tests are carried out directly on the polymer containing the stabilising compound.

In the case of stabilising compounds of phenolic nature, phenolic radicals characterised by long life have to form within the polymer in order for the antioxidant activity of the stabilising compound to take effect, and therefore the formation and stability of radicals of this type, originating from the reaction between the stabilising compounds of the present invention and benzoyl peroxide in toluene, are taken as parameters for evaluating the stabilising action of the stabilising compounds concerned.

In particular, in this test, toluene solutions containing 4% by weight of the stabilising compound are prepared simultaneously with solutions containing the same weight percentage of benzoyl peroxide. A small quantity of the stabilising compound solution is then mixed with an equal quantity of the benzoyl peroxide solution.

After mixing, a solution containing 2% by weight of each component is obtained. 1 ml of the resultant solution is then transferred to an ESR (electronic spin resonance) sample tube where it is degassed and sealed under vacuum. The system obtained in this manner is heated to 70° C. for 24 hours. The radical stability is checked by ESR spectra both during the 24 hour heating period and during the subsequent time, in which the system is left at rest to cool to ambient temperature. Table 1 shows for some compounds of the present invention the time required for the ESR signal intensity of the phenoxy radical to be reduced to one half and to one quarter of the maximum value reached during the period in which the toluene solution underwent heating to 70° C.

Accelerated thermal ageing tests are also carried out on polypropylene stabilised by the stabilising compounds of the present invention, and in particular the following tests are carried out:

measurements of the growth of the carbonyl index on polypropylene film containing the stabilising compound and subjected to thermal treatment; and measurements of the variation in the melt flow index of the polypropylene containing the stabilising compound and subjected to repeated extrusion.

In the first case, the carbonyl index is evaluated from the IR spectrum for the film, by measuring the band intensity at 1720 cm$^{-1}$, and is defined by the relationship:

$$Ico = 100 \frac{\log \frac{Io}{It}}{S}$$

where Io is the initial band intensity, It is the intensity at time t and S is the film thickness in $\mu$m.

The polypropylene film containing the stabilising compound is prepared by dissolving the stabilising compound in benzene and mixing the resultant solution with powdered polypropylene containing no other additive.

The stabilising compound is added in a quantity of 0.1% of the weight of the polymer. The benzene is then removed by evaporation under reduced pressure, and the residual powder is pressed into a film of 100 $\mu$m thickness.

The pressing is carried out at a temperature of 160° C. under a pressure of 900 kg/cm$^2$ for a time of 5 minutes. The film is extracted from the press and is rapidly cooled under running water.

The film prepared in this manner is then subjected to accelerated ageing in an air circulation oven at 140° C. Table 2 shows the induction times for the formation of the carbonyl band, these times being obtained by extrapolating to zero the curve of growth of carbonyl index against time of film treatment in the oven.

Finally, the melt flow index variation measurements are carried out on polypropylene powder mixed with the stabilising compound by stirring for 30 minutes in a planetary mixer. The repeated extrusions are carried out in an extruder of 19 mm diameter, of length 25 times its diameter, and provided with a 2 mm nozzle and a screw, the compression ratio being 1:4, the speed being 50 r.p.m. The temperature profile along the extruder is 175° C.; 230° C.; 270° C.; 270° C.

After each extrusion, the filament obtained is cut into granules to be subjected to a new extrusion passage.

At the end of each passage, some of the granules are used for measuring the melt flow index in accordance with ASTM-D1238, operating at 90° C. and at a pressure of 2.16 kg/cm$^2$.

The melt flow index values after 1, 3, 5 and 7 passages through the extruder are shown for polypropylene stabilised by certain stabilisers according to the present invention in Table 3.

The polypropylene used for the tests is the commercial product Moplen ® FL 20F of the Montedison Company.

TABLE 1

Time required to reduce to one half (t ½) and to one quarter (t ¼) the ESR signal intensity for the phenoxy radicals obtained by the interaction between the stabilising compound and benzoyl peroxide (70° C. for 24 hours).

| Stabilising compound | t ½ (hours) | t ¼ (hours) |
|---|---|---|
| Example 1 | 20 | 100 |
| Example 3 | 24 | 90 |
| Example 4 | 15 | 150 |

TABLE 2

Time of oven treatment (at 140° C.) required for inducing the formation of the IR band at 1720 cm$^{-1}$ in polypropylene films without stabilising compound and with stabilising compound.

| Stabilising compound | Induction time (hours) |
|---|---|
| Absent | 2 |
| Example 1 | 260 |
| Example 2 | 160 |
| Example 3 | 575 |

TABLE 3

Melt flow index of polypropylene containing the stabilising compound as a function of the number of successive passages through the extruder.

| Stabilising compound | Number of extrusions | | | |
|---|---|---|---|---|
|  | 1 | 3 | 5 | 7 |
| Example 3 | 7.34 | 9.91 | 12.59 | 14.61 |
| Example 4 | 7.42 | 10.36 | 13.09 | 15.78 |

We claim:

1. Phenolic stabilising compounds for organic polymers, selected from the group consisting of:

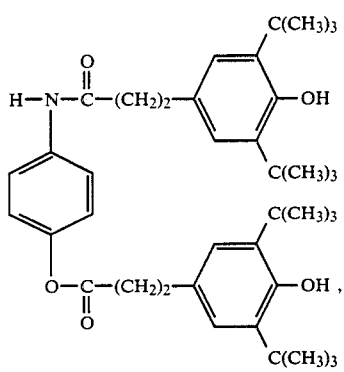
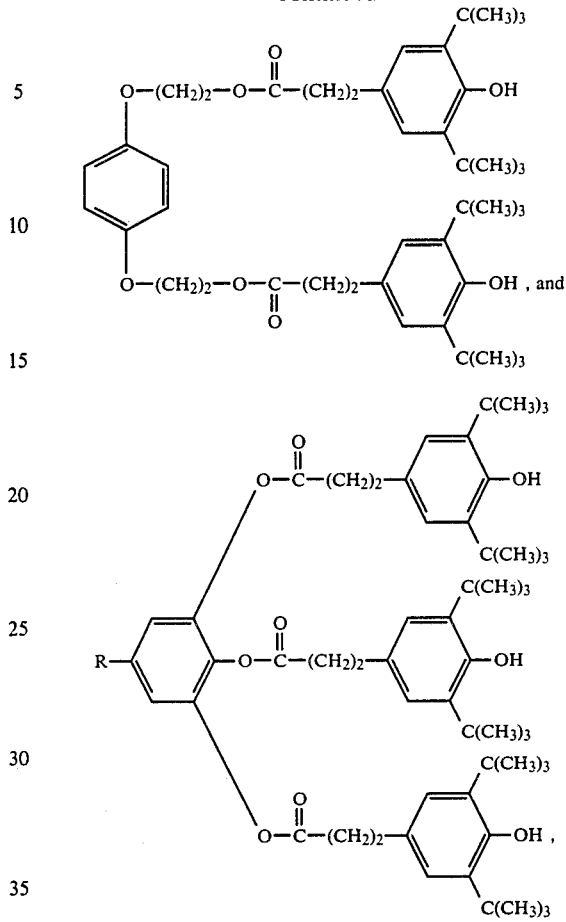
where R is hydrogen or carboxyl.
2. Stabilised polymer compositions, comprising an organic polymer and a quantity of between 0.1% and 5% by weight of at least one of the stabilising compounds as defined in claim 1.
* * * * *